United States Patent
Kolmanic et al.

(10) Patent No.: US 12,113,863 B1
(45) Date of Patent: Oct. 8, 2024

(54) VEHICLE COMMUNICATION SYSTEM

(71) Applicant: CETITEC GmbH, Pforzheim (DE)

(72) Inventors: Bojan Kolmanic, Remchingen (DE); Andrey Borisov, Pforzheim (DE)

(73) Assignee: CETITEC GMBH, Pforzheim (DE)

( * ) Notice: Subject to any disclaimer, the term of this patent is extended or adjusted under 35 U.S.C. 154(b) by 0 days.

(21) Appl. No.: 18/698,921

(22) PCT Filed: Sep. 28, 2022

(86) PCT No.: PCT/EP2022/076942
§ 371 (c)(1),
(2) Date: Apr. 5, 2024

(87) PCT Pub. No.: WO2023/057276
PCT Pub. Date: Apr. 13, 2023

(30) Foreign Application Priority Data

Oct. 6, 2021 (EP) .................................... 21201185

(51) Int. Cl.
*H04L 12/24* (2006.01)
*H04L 41/0803* (2022.01)
(Continued)

(52) U.S. Cl.
CPC .......... *H04L 67/12* (2013.01); *H04L 67/1097* (2013.01)

(58) Field of Classification Search
CPC .......................... H04L 67/12; H04L 67/1097
(Continued)

(56) References Cited

U.S. PATENT DOCUMENTS 11,593,085 B1 * 2/2023 Khare ..................... G06F 8/65
11,873,022 B2 * 1/2024 Yamada ................. H04L 12/40
(Continued)

FOREIGN PATENT DOCUMENTS

KR 20140078917 A * 6/2014 ............... H04L 9/34

OTHER PUBLICATIONS

International Search Report and Written Opinion issued in corresponding International Application No. PCT/EP2022/076942, dated Jan. 3, 2023, pp. 1-10.
(Continued)

*Primary Examiner* — Moustafa M Meky
*Assistant Examiner* — Elizabeth Kassa
(74) *Attorney, Agent, or Firm* — Carter, DeLuca & Farrell LLP

(57) ABSTRACT

A vehicle communication system includes a communication network, a plurality of processing units-being connected via the communication network with each other for transmitting and receiving data between them, each of the processing units being either one of a first type processing unit implementing a data consuming application, a second type processing unit providing data to other of the processing units, or a third type processing unit implementing a data consuming application and providing data to other of the processing units. Furthermore, it includes a plurality of data providers, each of the data providers being connected to a respective second type processing unit or a respective third type processing unit and providing respective data values to the associated processing unit. The second type processing unit and the third type processing unit are, upon receiving a data value from an associated data provider, configured to convert the data value into a self-describing binary format to add a timestamp attribute to the converted data value, the timestamp attribute comprising an absolute time information
(Continued)

indicating an expiry of the data value and/or indicating the time of creation of the data value, and to store the converted data value with timestamp attribute in a distributed data space, wherein the distributed data space comprises a set of in-memory databases of second type processing unit and third type processing unit. The data consuming application of a respective second type processing unit and/or of a respective third type processing unit is adapted to access the converted data value in the distributed data space via a predetermined standardized interface.

12 Claims, 1 Drawing Sheet

(51) Int. Cl.
  *H04L 67/1097* (2022.01)
  *H04L 67/12* (2022.01)
(58) Field of Classification Search
  USPC .......................................... 709/223
  See application file for complete search history.

(56) References Cited

U.S. PATENT DOCUMENTS

| | | | | |
|---|---|---|---|---|
| 2006/0204037 A1* | 9/2006 | Watanabe | ............. | G06V 20/58 701/1 |
| 2008/0109130 A1* | 5/2008 | Huang | ................ | G01R 31/007 701/31.4 |
| 2010/0106356 A1* | 4/2010 | Trepagnier | ........... | G05D 1/0214 701/25 |
| 2014/0005880 A1* | 1/2014 | Guenkova-Luy | ....... | H04L 67/12 701/31.4 |
| 2014/0042939 A1* | 2/2014 | Kobayashi | ............. | H02P 27/08 318/400.3 |
| 2015/0082289 A1* | 3/2015 | Leinfellner | ......... | G06F 11/3664 717/134 |
| 2016/0325729 A1* | 11/2016 | Askerdal | ............... | B60W 10/30 |
| 2020/0126324 A1* | 4/2020 | Hutchins | .............. | G07C 5/0808 |
| 2020/0412694 A1* | 12/2020 | Vanderveen | ........ | H04L 63/0263 |
| 2022/0078077 A1* | 3/2022 | Mifsud | ............... | G06F 9/45533 |
| 2022/0239528 A1* | 7/2022 | Yamamoto | .............. | H04L 12/40 |
| 2023/0169805 A1* | 6/2023 | Ramnani | ................ | G07C 5/008 701/29.3 |
| 2023/0171314 A1* | 6/2023 | Onti Srinivasan | .. | G06F 18/2431 370/474 |
| 2023/0275877 A1* | 8/2023 | Harel | ................ | G01C 21/3822 713/189 |
| 2023/0282036 A1* | 9/2023 | Simoudis | ............... | G07C 5/008 |
| 2024/0134628 A1* | 4/2024 | Teraoka | ................... | G06F 13/00 |
| 2024/0190447 A1* | 6/2024 | Kurita | ...................... | G06F 9/54 |

OTHER PUBLICATIONS

International Preliminary Report on Patentability issued in corresponding International Application No. PCT/EP2022/076942, dated Sep. 12, 2023, pp. 1-17, with Article 34 amendments.

Happ, D. et al., "Meeting IoT platform requirements with open pub/sub solutions" Ann. Telecommun. (Jul. 2016) pp. 41-52, vol. 72, No. 1.

Hong, D.K. et al., "AVGuardian: Detecting and Mitigating Publish-Subscribe Overprivilege for Autonomous Vehicle Systems" 2020 IEEE European Symposium on Security and Privacy (Sep. 2020) pp. 445-459.

Pinto, J. et al., "Towards a REST-style Architecture for Networked Vehicles and Sensors" IEEE Pervasive Computing and Communications Workshops (Mar. 2010) pp. 745-750.

\* cited by examiner

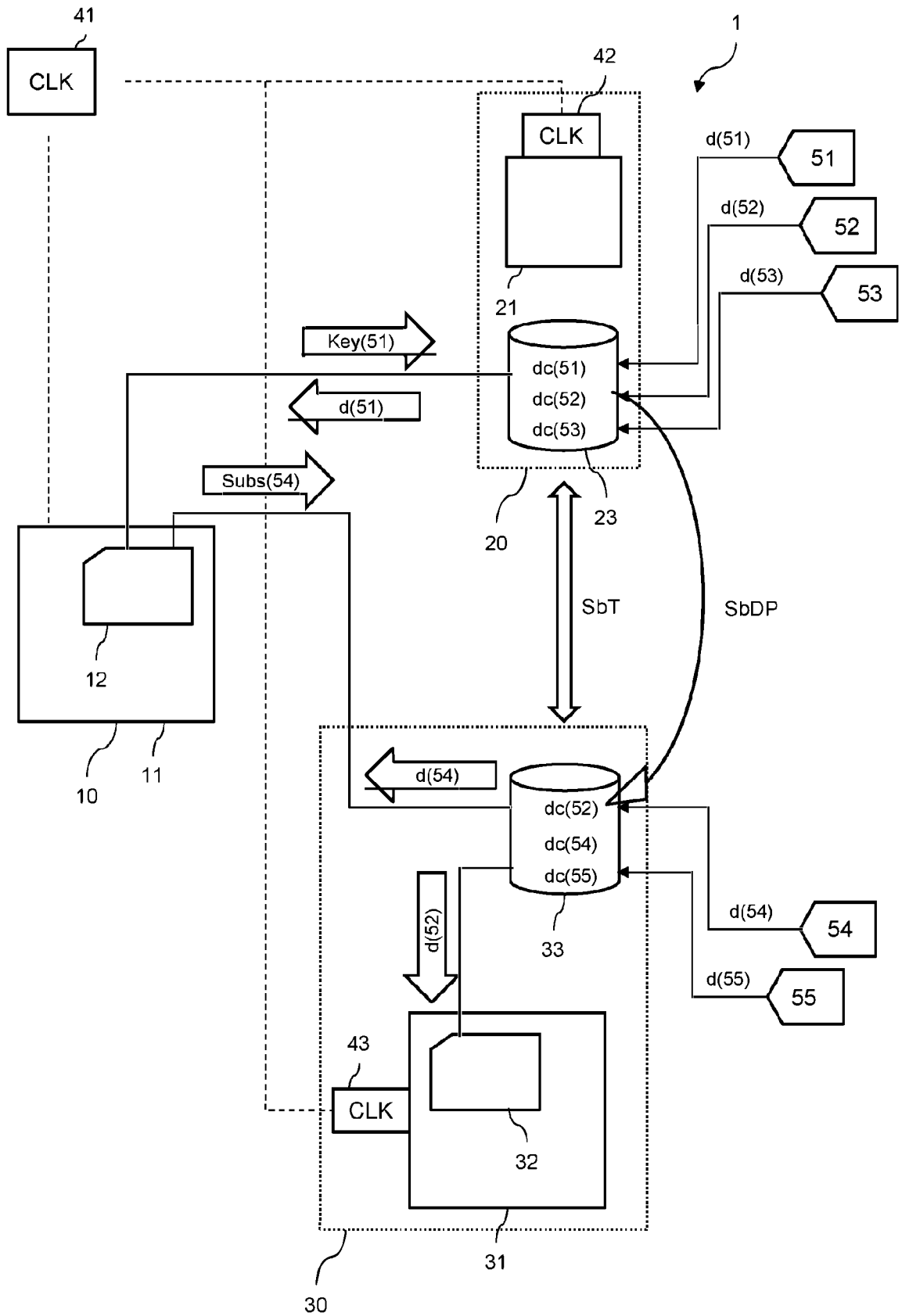

VEHICLE COMMUNICATION SYSTEM

CROSS-REFERENCE TO RELATED APPLICATION(S)

This is a national stage application filed under 37 U.S.C. 371 based on International Patent Application No. PCT/EP2022/076942, filed Sep. 28, 2022, which claims priority to European Patent Application No. 21201185.2 filed Oct. 6, 2021, the disclosures of which are incorporated herein by reference in their entireties.

FIELD OF THE INVENTION

The invention relates to a vehicle communication system and a vehicle comprising a vehicle communication system.

BACKGROUND INFORMATION

Modern vehicles contain a vehicle communication system being a distributed digital information and control system. The communication system is based on multiple processing units known as electronic control units (ECU) which are connected via a communication network consisting of a plurality of signal lines. The type of communication network may depend on the vehicle, a type of information exchanged between the processing units, and the like, and make use of known communication technologies, such as Ethernet, Controller Area Network (CAN), FlexRay and others.

Each processing unit may contain one or more services providing data to other processing units or implementing functions by means of data consuming applications. According to this, each processing unit is connected over the communication network as a client to the certain service using proxy software. A code for implementing a client and/or service and necessary for communication is usually provided by a connection middleware. The middleware is responsible for the communication between different processing units and supports a so-called distributed services model which is implemented with RPC pattern (Remote Procedure Call, request-response).

The known RPC-model mandates the creation of a particular service and interface objects for each service which inflates the size of generated code needed to support such services. Hence, even for similar, but different services, respective code is needed which, on the one hand, needs lots of space in memory and, on the other hand, requires respective creation of particular interface objects for each service.

It is therefore an objective of the present disclosure to provide a vehicle communication system which provides high flexibility with regard to different services implemented on a plurality of processing units of the vehicle communication system and at the same time requires less code to support the different services.

SUMMARY

The vehicle communication system includes a plurality of processing units being connected via a communication network with each other for transmitting and receiving data between them. Each of the processing units is either one of a first type processing unit implementing a data consuming application (also referred to as a func-tion), a second type processing unit providing data to other of the processing units, or a third type processing unit implementing a data consuming application and providing data to other of the processing units. While a processing unit of the first type is a data receiving processing unit, a processing of the second type corresponds to a data sending or providing processing unit. A processing unit of the third type both receives data from a data providing processing unit and provides itself data to other receiving processing units.

Furthermore, the vehicle communication system includes a plurality of data providers. Each of the data providers is connected to the second type processing unit or the third type processing unit, i.e., processing units which provide data to other processing units. Each of the data providers provides respective data values to the associated processing unit. The data values may be provided from the data provider by sending respective messages to the connected processing unit. The messages from the data provider may be sent on a regular basis, such as with a predetermined frequency, or triggered by an event. A data provider may comprise one of more sensors or the like.

Upon receiving a data value from an associated data provider, the second type processing unit and the third type processing unit (i.e., data providing processing units) are configured to convert the data value into a self-describing binary format and store the converted data value in a distributed data space. The distributed data space comprises a set of in-memory databases of the second type processing unit and the third type processing unit (i.e., data providing processing units). Each of the data consuming application accesses the converted data value in the distributed data space via a predetermined standardized interface.

The distributed data space is a set of in-memory databases which keeps data provided by the data providers in the self-describing binary format. The distributed data space enables unified access to the converted data in contrast to a distributed services approach with a dedicated service for each group of data between two communicating processing units. Furthermore, a data consuming application does not require additional generated code for a custom interface.

A in-memory database is regarded to be a data storage having only RAM persistence, providing the standardized interface and keeping the converted data values (also referred to as data elements) ordered in a way that a data consumer can obtain them or a portion by a known key.

According to a further embodiment, the converted data value comprises the data value represented in the self-describing binary format and an associated key. For example, each data provider is associated with a respective key. The key is used for identifying a specific data value as well as for retrieving data values of a specific data provider.

According to a further embodiment, the second type processing unit and the third type processing unit are, upon receiving a data value from an associated data provider, configured to add a timestamp attribute to the converted data value. Applying a timestamp attribute to a converted data value allows data synchronization between different in-memory database instances as well as synchronizing different types of data values by data consuming applications. In addition, it is possible to implement data expiration strategies by demand. The timestamp attribute may be a high precision synchronized time common for the entire vehicle. For example, synchronizing of time may be done via gPTP-protocol (generic Precision Time Protocol) according to standard IEEE 1588 or other similar derived protocols. For example, they may be part of AUTOSAR specification of legacy field bus systems like: CAN, CANFD, FlexRay.

According to an embodiment, the timestamp attribute comprises an ingress timestamp of when the data value is received by the second type processing unit and the third type processing unit from an associated data provider. Alternatively or additionally, the timestamp attribute may comprise an absolute time information indicating an expiry of the data value. Alternatively or additionally, the timestamp attribute may comprise an absolute time information indicating the time of creation of the data value. Absolute time can be used to mark an expiry time of a data value or mark the time when a message comprising the data value is created. Furthermore, it is possible to implement a data expiration strategy by demand on examining the timestamp attribute by a data receiving processing unit. It can be used to detect whether a message containing a data value is valid and did no expire. If a processing unit containing a data consuming application has subscribed to the data values of a specific data provider, they need to detect whether the received data value is "valid". This information may be examined from the converted data value containing the time.

According to a further embodiment, the set of in-memory databases is configured to be synchronized in real time. The synchronization may be made with the help of the timestamp attribute. The timestamp attribute not only allows data synchronization between different in-memory databases, but also a synchronization of different types of data values provided by different data providers. This synchronization may be made by those processing units which access the data, e.g., by means of the data consuming application, from different data providing processing units.

With unified access to the converted data values, containing the timestamp attribute, the key and the data value, over the predetermined standardized interface, remote filtering and subscription is possible. In addition, data consuming applications do not require additional generated code for a custom interface. The standardized interface may also be used to store the converted data values in the in-memory database. According to a further preferred embodiment, the standardized interface may be a CRUD (create, read, update, and delete) interface. The CRUD interface enables easy implementation of the vehicle communication system according to the invention.

According to a further embodiment, the self-describing binary format may be MessagePack or Google Protocol Buffers, but not limited to.

According to a further embodiment the data consuming application is configured to subscribe to one or more of the converted data values in the distributed data space via a subscription request. The subscription request may contain at least one of: a filter information about what specific converted data values shall be received; a trigger information; a throttling information. A subscription of data is useful in the case where polling of data from the data consuming application is to be avoided. For example, instead of requesting the converted data values on a regular basis, a subscription to updates can be set up by the data consuming application resulting in a notification in case a predetermined trigger event arrives. By using subscriptions, the data consuming application can subscribe to the converted data values of a specific data provider. In the subscription, a trigger event can be defined by using a trigger information, e.g. values of requested data provider have to be greater than a given value. Furthermore, it can be defined by the throttling information in what frequency the data values shall be received where the requested receiving frequency can differ from the frequency with which data values are updated (converted) on the data provider side.

According to a further embodiment, the distributed data space comprises further memories and is configured to store a copy of the converted data values of one of more data providers of at least one of the in-memory databases in the respective further memory. Preferably, a respective memory of the further memories is a memory of the first type processing unit or the third type processing unit (i.e., a data receiving processing unit) implementing a data consuming application. The further memory enables providing access to the converted data values as close as possible to data consuming application. As a result, there is less traffic on the communication network. Furthermore, delay upon accessing the data values can be avoided.

By providing further memories, data aggregators can be placed as near as possible to data providing processing units. The data aggregators may be in the form of the in-memory databases which are fast, provide the possibility to keep complex data structure using the unified standardized interface for data access, thus being able to do data throttling and filtering. If the in-memory databases are synchronized, it is possible to have a configuration where a copy of the required data from different data providing processing units is close to the data consuming application of a processing unit.

According to a second aspect of the present invention, a vehicle including a vehicle communication system according to one or more embodiments as described above is provided. The vehicle has the same advantages as set out in conjunction with the vehicle communication system.

BRIEF DESCRIPTION OF THE DRAWINGS

The invention will be described in more detail by reference to the accompanying fig-ure.

FIG. 1 shows a schematic overview over a vehicle communication system according to the invention.

DETAILED DESCRIPTION

FIG. 1 shows a schematic illustration of a vehicle communication system 1 according to an embodiment of the present invention. The vehicle communication system 1 includes a plurality of processing units 10, 20, 30 which are connected with each other for transmitting and receiving data between two of them via a plurality of signal lines of a communication network, such as Ethernet, CAN, FlexRay or the like. While the present embodiment shows a number of three processing units 10, 20, 30, it is to be understood that the number of processing units in the vehicle communication system 1 may be arbitrary and in particular greater than three.

By way of example only, the processing unit 10 represents a first type processing unit implementing a data consuming application 12 running on it. The processing unit 20 is a second type processing unit providing data to other processing units, in the present example processing unit 10 and processing unit 30. Processing unit 30 is a third type processing unit implementing a data consuming application 32 and providing data to other of the processing units, in the present example processing unit 10. The first type processing unit 10 and the third type processing unit 30 are also referred to as data consuming or data receiving processing units. The second type processing unit 20 and the third type processing unit 30 which provide data to other processing units are also referred to as a data providing processing units.

The vehicle communication system 1 furthermore comprises a plurality of data providers 51-55. Each of the data providers 51-55 may comprise one or more sensors gathering specific information of the vehicle or its environment, such as tempera-tures, moisture, pressure, and so on. By way of example only, three data providers 51, 52, 53 are connected to the second type processing unit 20. The data providers 54, 55 are connected to the third type processing unit 30.

Each of the data providers 51-55 provides respective data values d (51)-d (55) to the associated processing unit 20 or 30, where the suffix in parentheses indicates the data provider of the data values d. Provision of respective data values d (51)-d (55) may be in the form of messages which are generated by the data providers 51-55 on a regular basis, e.g., with predetermined regular time intervals, or based on a trigger event. According to the data provider and the data it is providing to the associated processing unit, the predetermined time interval may vary or be the same.

The processing units 10, 20, 30 are conventional processing units comprising a processor 11, 21, 31 and a memory providing a respective software for providing the functionality of the respective processing unit. Hence, the data consuming applications 12, 32 of the data consuming processing units 10, 30 are executed on the respective processor 11, 31 executing a program which is stored in the not shown memory of the respective processing unit.

The communication system 1 furthermore comprises clocks 41, 42, 43. Clock 41 may be a master clock of the vehicle or a clock of the processing unit 10 or associated to it. Clock 42 is associated to or part of processing unit 20. Clock 43 is associated to or part of processing unit 30. Clocks 41, 42, 43 are synchronized such that a time is common for the entire vehicle. The known gPTP-protocol or any other suita-ble protocol may be used for synchronization.

The data consuming applications 12, 32, also referred to as functions of the respective processing units 10, 30, use the data values of one or more of the data providers 51-55 for performing a predetermined functionality of the application 12, 32. De-pendent from the data consuming application 12, 32, respective data values are pro-cessed in regular time intervals or on a time-to-time basis.

To avoid the known distributed services approach with a dedicated service for each group of data, a network of synchronized in-memory databases is proposed. For this reason, the data providing processing units 20, 30 are configured to provide a respective in-memory database 23, 33. The totality of in-memory databases 23, 33 represents a distributed data space.

The data providing processing units 20, 30 are configured, upon receiving a data value d (51)-d (55) from the associated data provider 51-55, to convert the received data value d (51)-d (55) into a self-describing binary format and store the converted data value dc (51)-dc (55) in its respective in-memory database 23 or 33 of the data providing processing unit 20 or 30.

The data consuming applications 12, 32 of the data consuming processing units 10, access the converted data value dc (51)-dc (55) in the distributed data space, i.e., the set of in-memory databases 23, 33, via a predetermined standardized interface, such as the known CRUD (Create, Read, Update, and Delete) interface.

The self-describing binary format contains its structure description inside that allows to manipulate the data without having its schema on in-memory database 23, 33. For example, Google Protocol Buffers or MessagePack may be an example of a self-describing binary format which is widely used. By using a self-describing binary format unlimited complex data structures may be used. Furthermore, a data scheme inside the in-memory database is not necessary which enables fast communication. The self-describing binary data format allows mimic relation tables where each record has the same structure. Moreover, it allows to have different data structures for each particular converted data. As a result, this allows to have objects database. The binary format allows to avoid serialization on service side and data can be delivered very fast. Compact structure tags save processor time and network bandwidth.

The converted data value dc (51)-dc (55) comprises an associated key besides the data value d (51)-d (55) represented in the self-describing binary data format, i.e.: dc (x)=<Key, d (x)>, where x=51-55. The associated key may be associated to a respective data provider 51-55, for example. In addition, each converted data value dc (51)-dc (55) comprises a timestamp attribute which is added, upon receiving a data value d (51)-d (55) from an associated data provider 51-55, by the data providing processing units 20, 30 to the converted data value dc (51)-dc (55). The timestamp attribute enables to synchronize the set of in-memory databases 23, 33 in real time, as the clocks 42, 43 of the data providing processing units 20, 30 are synchronized. The synchronization of the timestamps between the processing units 20 and 30 is outlined by arrow SbT.

Access to specific of the converted data values dc (51)-dc (55) may be made by the data consuming processing units 10, 30 using a key. For example, data consuming application 12 running on the processing unit 10 needs the data values of data provider 51. To get access to these data values, the processing unit 10 sends a message containing the key of the data provider 51 "Key (51)" to the processing unit 20 hosting the in-memory database 23. The in-memory database 23 in turn provides the data values d (51) of data provider 51 that are stored in it.

On the other hand, data consuming application 12 can subscribe to the data values d (54) of data provider 54. In this case, the data consuming application receives the data values d (54) every time when a new value is provided by the data provider 54. To do so, the processing unit 10 sends a subscription message "Subs (54)" to the processing unit 30. The in-memory database 33 in turn provides the data values d (54) of data provider 54 immediately they are stored in it. A subscription might be used to avoid requesting data continuously on the consumer side, e.g., based on a trigger event. A subscription of data is useful in the case where polling is to be avoided on the data consuming application side. For example, instead of requesting converted data values every 100 ms to extract them, a subscription to all updates can be set up by the data consuming application resulting in a notification in case a predetermined trigger event arrives. As the converted data values dc (54) received by the data consuming application 12 contain the timestamp attribute, filtering and throttling is possible using the timestamp attribute. This enables the data consuming processing units to have data on demand, with the amount needed and in time.

Applying the timestamp attribute to the converted data values allows data synchronization between different in-memory databases 23, 33 as well as synchronizing different types of data-by-data consuming applications. It is furthermore possible to implement data exploration strategies by demand.

The timestamp attribute may comprise an ingress timestamp of when the data value d (51)-d (55) is received by the data receiving processing unit from the associated data provider 51-55. Alternatively or additionally, the timestamp attribute may comprise an absolute time information indicating an expiry of the data value d (51)-d (55) or indicating the time of creation of the data value d (51)-d (55). Absolute message time can be used to detect whether a data value is valid and did not expire. As the arrival of messages containing the data values is often used as a trigger which implies that message timing/latency is critical and needs to be specified and supervised. In the present implementation, data receiving applications access data values when they are needed and they are able to react on incoming data using the timestamp attribute. In the present embodiment, data consuming application 32 running on the processing unit 30 wishes to receive the data values of data provider 52 whose converted data values dc (52) are stored in the in-memory database 23 of different processing unit 20. To be able to access the data values of data provider 52, a copy of the converted data values dc (52) is stored in the in-memory database 33 of processing unit 30. The in-memory database 33 represents a "further memory" for the converted data values dc (52) in this embodiment. Storing both of the converted data values dc (52) of data provider 52, associated to data processing unit 20, and the converted data values dc (54) and dc (55) of data providers 54 and 55, associated to data processing unit 30, in the in-memory database 33 of processing unit 30 allows a data aggregation for data consuming application 32 running on the processing unit 30. As a result, there is less traffic on the communication network. Furthermore, delay upon accessing the data values can be avoided.

The synchronization between the converted data values dc (52) in-memory database 23 of processing unit 20 and the converted data values dc (52) in-memory database 33 of processing unit 30 is made in real-time. The synchronization of the converted data values dc (52) between the in-memory databases 23 and 33 is outlined by arrow SbDP.

Generally, the distributed data space may include an arbitrary number of further memories (not shown) to store a copy of converted data values of the respective data provider. This enables to reduce communication traffic on the communication network. The further memory may be provided in a respective data consuming processing unit, in the present example processing unit 10 or 30. Each further memory enables creating a data aggregator that is placed as near as possible to data consumer. It may make use of a CRUD like interface and can do data throttling and filtering.

The proposed solution can be provided as a pure library without network and Threading inside. Functions that this library provides are pure and have no side effect but allow to transform an incoming data stream either in a set of messages (input and response) as well as set of call-backs. In this case, a developer has the freedom to put this library in a certain point in its communication framework and handle data in a thread controlled by his data consuming application. The library is network and thread agnostic.

In the following, an example for accessing data in the distributed data space will be explained assuming that a data provider comprising four sensors is connected to a data providing processing unit which hosts an in-memory database. The data provider provides the following sensor data as data value:
1. internal temperature
2. external temperature
3. moisture (%)
4. pressure.

The data from the data provider can be represented as:
message Conditions
{
  Uint64 time_stamp: 1
  Float internal_temperature: 2
  Float external_temperature: 3
  Uint8 moisture: 4
  Uint32 pressure: 5
}

The data inside the in-memory database can be stored with a predetermined key, e.g., "car.sens.cond" and can be represented in binary format with pairs [key]: [value] representing the converted data value or data element. In the present example, the data value contains four different sensor values which are indicated by a respective field number "1", "2", "3" and "4", followed by the respective sensor value. This results in, e.g.:
  „car.sens.cond ": 1:0x12345758; 2:21.2; 3:10.3; 4:43; 5:995

The processing unit connected to the data provider is configured for receiving the above mentioned data values with some period from the data provider, formatting it to the binary form and storing it into the in-memory database using the standardized interface, e.g. CRUD interface. These tasks may be executed by a dedicated unit of the processing unit, e.g. a sensor-driver, or the general processor of the processing unit. The converted data value with an optional subset key "ecu1" (e.g. the name of the processing unit) may be created by the processing unit with the command:
  create "ecu1" "car.sens.cond": 1:0x12345758; 2:21.2; 3:10.3; 4:43; 5:995

The in-memory database does not need to have any knowledge about the name of the fields (i.e. no generated code required for data), and thus can store any data formatted as shown in the present example without creating an internal schema of the data.

Hence, no recompilation or restart of the database is necessary.

A data consuming processing unit can request the data by using the key. The key (including the subset key "ecu1" in this example) is sent in a message "read" from the data consuming processing unit to the processing unit hosting the in-memory database:
  read „ecu1", „car.sens.cond"

The in-memory database returns a response containing the converted data value to the data consuming processing unit: 1:0x12345758; 2:21.2; 3:10.3; 4:43; 5:995.

The data consuming processing unit has knowledge about the data description. Then, it can access data dynamically just using the field number contained in the data value and indicating a respective sensor value. This procedure doesn't require any special generated code.

In case that the data consuming processing unit only needs an information about the external temperature having the field number "3", the data processing unit sends a request using a filter "3?" to the in-memory database:
  read „ecu1", „car.sens.cond", 3?

The in-memory database returns part of the stored data without any knowledge of its meaning: 3:10.3

If the data consuming processing unit (which can be referred to as a subscriber in this example) wants to subscribe to a specific sensor value, e.g. external temperature having the field number "2", and receive a notification only when the sensor value of it becomes, for example, less than 3° C. corresponding to possible ice on road, the subscription request to the in-memory database contains the filter information "2?" rep-resenting the field number "2" and a trigger information "when 2: less 3" and thus reads:
  subscribe „ecu1", „car.sens.cond", 2: ?, when 2: less 3

In this way, filtering of data is possible. The in-memory database can still handle such requests even though it has no knowledge of its meaning. Thus, unnecessary communication in the communication network can be avoided.

The data provider provides all data periodically to the data providing processing unit. However, the in-memory database notifies the data consuming processing unit (subscriber) only if the sensor value of field number "2" becomes less than 3 (trigger event).

In addition, it is possible to set a throttling mode for the in-memory database, thereby sending notification less frequent, e.g. once in a minute.

Using subscriptions, it is possible to connect to multiple in-memory databases in case of data replication (redundant systems) and allow safety or other relevant scenarios.

As noted above, each converted data value (data element) stored in the in-memory database has attached a timestamp attribute (timestamp). The timestamp is synchronized using the known PTP protocol or any similar protocol so that all processing units are in one time domain. The timestamp allows data consuming processing units to verify whether data may be outdated or not. It can compare the data element to other data received from other data providers which might be important for safety applications.

As all signals and data elements have timestamps, the processing unit easily can ar-range them based on time and make complex decision based on set of data. The abil-ity of subscription to some data elements is possible not only for data consuming applications but also for different in-memory databases and allows to implement data caching. Furthermore, using timestamps allows to control validity if the data is outdated.

This will be explained by the following scenario:
1. A data provider (sensor) is connected to a data providing processing unit (ECU #1) and produces data with a speed of 1/100 second.
2. A data consuming processing unit (ECU #2) runs an application that requires this data with a frequency once per second.
3. In case of a direct connection between ECU #1 and ECU #2, it is possible to organize a remote connection between the application on ECU #2 and the in-memory database on ECU #1 and
   a. allow pulling data once a second (resulting in the necessity that ECU #2 has to spin the application in some cycle and spend re-sources on it); or
   b. allow a subscription from application to ECU #2 with throttling (in this case the application on ECU #2 has to know about two connection points to ECU #1 and ECU #2).
4. Data caching in further memory: It is possible to organize a subscription from the in-memory database running on ECU #2 to ECU #1 with 1 second throttling for required data and provide it in a local further memory for application. In this case application only needs to know the connection to the in-memory database running on ECU #2.
5. In case of a failure on ECU #1, the application running on ECU #2 still has data containing a timestamp attribute. This allows the application to use the data in an emergency scenario and at the same time the determination when data is getting outdated.
6. Caching can help to organize a security domains when some application is not allowed to have remote connections outside of its restricted zones. Therefore, all required data are just cached on local database.

The scenario described above allows to create a hierarchical system of data where the higher-level unit (in hierarchical sense) has connections to lower-level units which run applications (data consuming processing units), in-memory databases (data providing processing units) linked with each other and has connected data providers. The higher-level unit can access remote databases directly as well as set up data replication for its applications using its own in-memory database with data caching.

LIST OF REFERENCE NUMERALS 1 vehicle communication system
processing unit
11 processor
12 data consuming application
processing unit
21 processor
22 data consuming application
23 in-memory database
processing unit
31 processor
32 data consuming application
33 in-memory database
41 clock
42 clock
43 clock
51 data provider (e.g. sensor)
52 data provider (e.g. sensor)
53 data provider (e.g. sensor)
54 data provider (e.g. sensor)
55 data provider (e.g. sensor)
d (x) data value of data provider x (x=51, . . . , 55)
dc (x) converted data value of data provider x (x-51, . . . , 55)
SbT synchronization by time attribute (e.g. timestamp)
SbDP synchronization by data provider

The invention claimed is:

1. A communication system for a vehicle, comprising as components of the vehicle:
   a communication network;
   a plurality of processing units being connected via the communication network with each other for transmitting and receiving data between them, each of the processing units being either one of a first type processing unit implementing a data consuming application, a second type processing unit providing data to other of the processing units, or a third type processing unit implementing a data consuming application and providing data to other of the processing units;
   a plurality of data providers, each of the data providers being connected to a respective second type processing unit or a respective third type processing unit and providing respective data values to the associated processing unit;
   wherein
   the second type processing unit and the third type processing unit are, upon receiving a data value from an associated data provider, configured to convert the data value into a self-describing binary format that contains its structure description inside, to add a timestamp attribute to the converted data value, the timestamp attribute comprising an absolute time information indicating an expiry of the data value and/or indicating the time of creation of the data value, and to store the converted data value with the timestamp attribute in a distributed data space, wherein the distributed data space comprises a set of in-memory databases of a respective second type processing unit and a respective third type processing unit;
   the data consuming application of a respective second type processing unit and/or of a respective third type processing unit is adapted to access the converted data value in the distributed data space via a predetermined standardized interface.

2. The vehicle communication system according to claim 1, wherein the converted data value comprises the data value represented in the self-describing binary format and an associated key.

3. The vehicle communication system according to claim 2, wherein each data provider is associated with a respective key.

4. The vehicle communication system according to claim 1, wherein the timestamp attribute comprises an ingress timestamp of when the data value is received by a respective second type processing unit and a respective third type processing unit from an associated data provider.

5. The vehicle communication system according to claim 1, wherein the set of in-memory databases is configured to be synchronized in real time.

6. The vehicle communication system according to claim 1, wherein the standardized interface is a CRUD interface.

7. The vehicle communication system according to claim 1, wherein the self-describing binary format is MessagePack or Google Protocol Buffers.

8. The vehicle communication system according to claim 1, wherein the data consuming application is configured to subscribe to one or more of the converted data values in the distributed data space via a subscription request.

9. The vehicle communication system according to claim 8, wherein the subscription request contains at least one of:
- a filter information about what specific converted data values shall be received;
- a trigger information;
- a throttling information.

10. The vehicle communication system according to claim 1, wherein the distributed data space comprises further memories and is configured to store a copy of the converted data values of one of more data providers of at least one of the in-memory databases in the respective further memory.

11. The vehicle communication system according to claim 10, wherein a respective of the further memories is a memory of a respective first type processing unit or a respective third type processing unit implementing a data consuming application.

12. A vehicle comprising a vehicle communication system according to claim 1.

* * * * *